United States Patent [19]

Bermingham

[11] Patent Number: 4,575,359
[45] Date of Patent: Mar. 11, 1986

[54] ROTARY DRIVE COUPLING
[75] Inventor: Patrick D. Bermingham, Ancaster, Canada
[73] Assignee: Bermingham Construction Limited, Ontario, Canada
[21] Appl. No.: 606,252
[22] Filed: May 2, 1984
[51] Int. Cl.⁴ .......................... F16D 3/30; F16D 3/16
[52] U.S. Cl. ...................................... 464/123; 464/19
[58] Field of Search ............... 464/901, 106, 122, 123, 464/124, 150, 18–21; 166/355

[56] References Cited

U.S. PATENT DOCUMENTS

| | | | |
|---|---|---|---|
| 1,859,426 | 5/1932 | Beremand | 464/18 |
| 2,266,383 | 12/1941 | Quintrell | 464/123 X |
| 2,712,436 | 7/1955 | McCune et al. | 464/19 |
| 2,779,570 | 1/1957 | Roper | 464/19 |
| 2,863,638 | 12/1958 | Thornburg | 464/20 X |
| 3,231,029 | 1/1966 | Winberg | 464/19 X |
| 3,733,853 | 5/1973 | Sutliff et al. | 464/19 |
| 4,145,896 | 5/1979 | Pringle | 464/123 |

Primary Examiner—Stuart S. Levy
Assistant Examiner—Thomas R. Hannon
Attorney, Agent, or Firm—Larson and Taylor

[57] ABSTRACT

A heavy duty rotary drive coupling is suitable for use in drilling holes in subterranean formations. The coupling includes passages for delivering drilling fluids to and from the bottom of the drill hole, and yet is designed to accommodate axial misalignment and can be rapidly connected and disconnected. The drive coupling is particularly suitable for use in floating drilling platforms.

18 Claims, 9 Drawing Figures

ROTARY DRIVE COUPLING

BACKGROUND OF THE INVENTION

1. Field of the Invention

This invention relates to a new or improved rotary drive coupling, and in particular to a coupling which is capable of transmitting torque and axial thrust forces of high magnitude, and is also capable of accommodating minor angular misalignments between the driving and driven rotating members.

2. Description of the Prior Art

Drilling apparatus employed for drilling holes into subterranean rock formations must, of necessity, be of rugged construction and capable of applying high torques and high axial loadings to effect satisfactory operation of the cutter head in the rock formation. Such drilling arrangements include a drilling motor coupled to the kelly bar of a drill string and means to remove the rock cuttings from the bottom of the drill hole to the surface, such means normally comprising a flow of fluid directed downwards in passages through the kelly bar and drill string to entrain the cuttings from the bottom of the drill hole and carry them upwards to the surface through a separate passage in the drill string. The drill motor is normally arranged upon a fixed drilling platform mounted on the earth surface. Where the hole being drilled is in an underwater rock formation, then the drilling platform may be mounted upon a floating structure such as a barge or scow, or may be fixedly mounted e.g. upon stilt-like legs resting upon the bed of the body of water. Drilling from a floating platform such as a scow is desirable from the point of view of cost, but entails the difficulty of transmitting the driving torque while accommodating movement of the platform as is occasioned by wind and wave action, tides, etc. Furthermore, with a floating drilling platform it is desirable that the drilling motor should be capable of being disconnected from the kelly bar and drill string quickly so that drilling can be interrputed and the scow removed to safety during adverse weather conditions. Existing drilling systems have not been able to satisfy these requirements.

SUMMARY OF THE INVENTION

The present invention provides a coupling for transmitting a rotary drive between a driving member and a driven member that are engagable in a mutually registered position, said coupling comprising:

(a) co-operating bearing surfaces on said members engagable in said registered position to transmit axial thrust between said members, said bearing surfaces being spherically curved to permit limited angular misalignment between the axes of said members;

(b) torque-transmitting means on said members cooperating to transmit the rotary drive;

(c) locking means engagable to form a locking connection between said members; and (d) control means selectively operable to control engagement of said locking means;

wherein said locking means when engaged is adapted to accommodate said limited misalignment while maintaining firm engagement of said members against high separation forces, and is adapted to disengage rapidly in response to operation of said control means, to permit separation of said members.

The locking means is preferably provided by a number of fluid-pressure actuated cylinder/piston assemblies controlled by a valve, the cylinders being mounted upon one of the members and having piston rods adapted to form a locking engagement with locking formations on the other member upon actuation of the piston rods under the control of the valve, so that the driving connection between the members can be established or broken rapidly.

The coupling preferably includes passage systems for transmitting drilling fluids, e.g. individual passageways for directing air and water downwardly through the coupling, the kelly bar and drill string to the bottom of the bore hole, and a further passageway for channelling a mixture of air, water and entrained cuttings upwardly through the drill string, kelly bar and coupling, to remove cuttings from the bottom of the bore hole.

In a preferred arrangement, the driving member comprises a generally cylindrical housing connectable to the drilling motor and defining a socket. A spherically formed ball received in sliding engagement within the socket is connected to the drill string through a clutch plate mounted on the kelly bar. Discreet axially directed passages extend downwardly through the socket to the interface with the ball, and through the ball, clutch plate, kelly bar and the drill string to the bottom of the drill hole, a separate axially return passage extends upwardly through the drill string, kelly bar, clutch plate and ball, and through the interface between the ball and the socket to an axially passage in the socket, for return flow of the mixture of drilling fluid and entrained cuttings. The joint is designed for limited angular deviation between the axis of the socket and the kelly bar about the centre curvature of the spherical surfaces, while maintaining communication between the upper and lower sections of the passages at the interface surface. In the embodiments hereinafter described, the amount of misalignment which can be accommodated is 3°, but, depending upon the application and the design of the components, a greater or lesser amount of misalignment could be accommodated.

The piston/cylinder assemblies are arranged on the periphery of the socket at equal angular intervals and extend generally in the axial direction. The cylinders are mounted to pivot in a radial plane and are urged radially inwards by spring means. Each piston rod carries a pin which is engageable upon retraction of its piston rod with a complementary locking formation on the lower coupling member to draw the ball into firm bearing engagement with the socket. Torque is transmitted between the socket and the ball by a pair of cam follower rollers mounted on the socket and cooperating with suitable slots in the ball.

Misalignment between the axes of the socket and ball is accommodated by sliding movement at the spherical interface, and to permit unimpeded driving rotation of the coupling when such misalignment is present, the high pressure sides of the piston/cylinder assemblies are interconnected such that the pressurized fluid is free to flow from one cylinder to the next. The sum of the lengths of piston rod extension remains constant as the coupling rotates while a firm engagement between the socket and ball is maintained.

To disconnect the coupling the piston rods of the piston/cylinder assemblies are extended, and a cam plate associated with the ball is rotated to swing the piston/cylinder assemblies outwardly so that the locking pins on the piston rods are displaced radially outwardly with respect to the locking formations so as not to interfere when the socket and ball are lifted off the clutch plate.

The hydraulic system controlling operation of the piston/cylinder assemblies is preferably designed to be self-contained and to be operated by means of a hand-powered hydraulic pump. Therefore, to establish the coupling, the socket and ball are lowered onto the clutch plate; the ball and socket rotated to line up drive teeth in drive sockets of the clutch plate; the cam plate is rotated to allow the piston/cylinder assemblies to swing inwardly (this movement being effected by the spring means); the hand powered pump is actuated to deliver hydraulic fluid to the high pressure side of the piston/cylinder assemblies and thus retract the piston rods, moving the locking pins into engagement with the respective locking formations to establish the coupling. The hand powered pump is thereafter disconnected so that the coupling can be rotated. The hydraulic system preferably includes an arrangement of accummulators which can be operated to move the piston/cylinder assemblies to the disengaged system without the requirement for the application of any external source of power.

BRIEF DESCRIPTION OF THE DRAWINGS

The invention will further be described, by way of example only, with reference to the accompanying drawings, wherein.

DESCRIPTION OF THE PREFERRED EMBODIMENT

Figure 1:
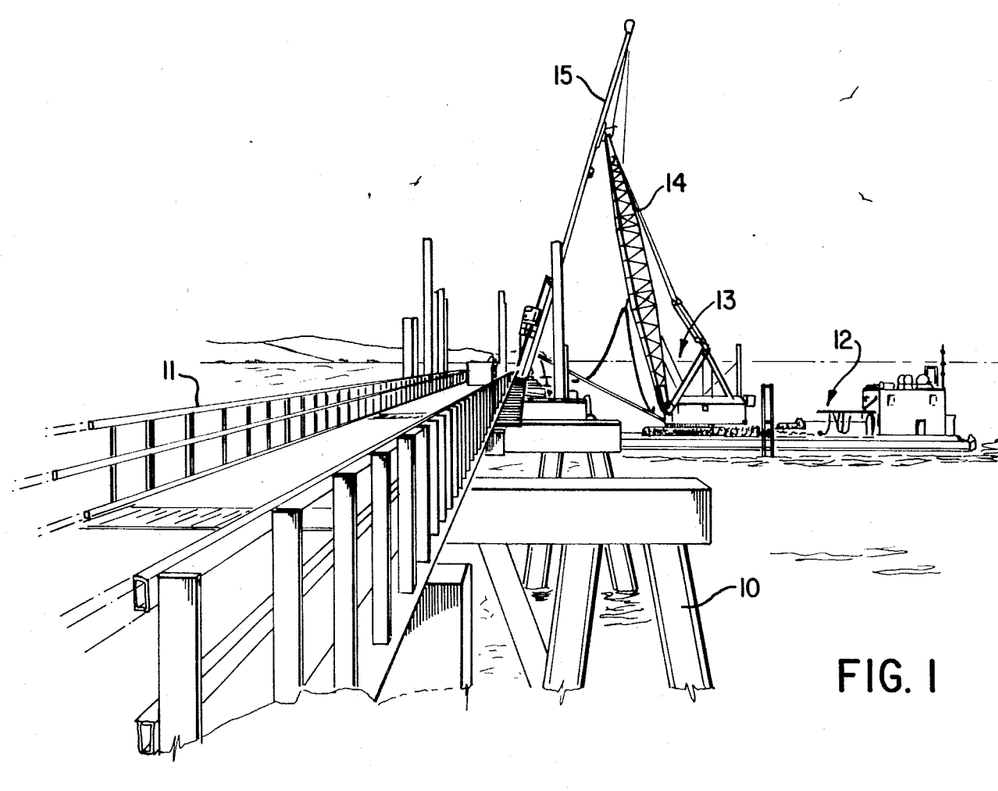
FIG. 1 is a view of a scow drilling platform in operation in drilling bore holes for piling in an underwater rock formation.

The rotary drive coupling described herein is employed as shown in FIG. 1 in an arrangement for drilling underwater bore holes to receive piling 10 for a pier 11. A floating barge or scow 12 supports a handling rig 13 having a boom structure 14 supporting leads 15. As is well known, the rig 13 is capable of manipulating the boom structure 14 to arrange the leads in a predetermined orientation, whether it be vertical, or, as shown, inclined.

Figure 2:
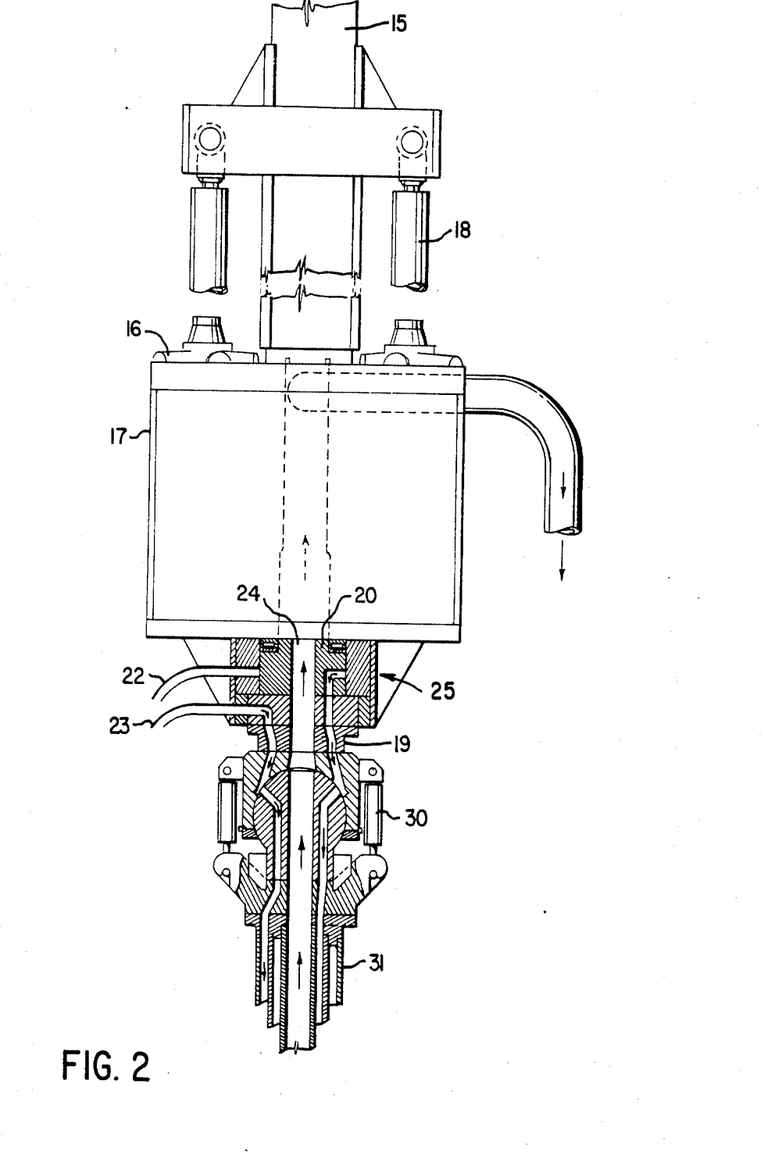
FIG. 2 is a schematic side view partly in section and showing a drilling motor connected to a kelly bar through a rotary drive coupling in accordance with the invention.

As is shown in FIG. 2, a drilling motor 16 is supported on a frame 17 which is guided for movement longitudinally of the leads 15, such movement of the frame and drilling motor being controlled by a hydraulic ram system 18 acting between the leads and the frame 17.

The drilling motor 16 mounted in the frame 17 has a rotary output shaft 20 coupled to a short kelly bar 19.

The lower end of the kelly bar 19 is in turn connected to the top of a rotary drive coupling 30, the lower end of which is connected to a further kelly bar 31 which in turn is coupled to the drill string and drilling cutter (not shown). As will be explained more fully below, the rotary drive coupling 30 is adapted to transmit torque and axial thrust via the kelly bar 31 to the cutter, and also to deliver to the cutter separate flows of air 22 and water 23 to entrain the cuttings at the bottom of the drill hole and carry them upwardly through the kelly bar and coupling 30 through a further passage means 24. The air and water flows are supplied through a rotary transfer assembly 25 mounted on the underside of the frame 17 and surrounding the shaft 20. The coupling 30 is furthermore designed to accommodate minor angular misalignment between the axis of the motor shaft 20 and the lower kelly bar 31, and to be capable of being quickly disconnected so that the scow 12 can be removed from the drilling site when adverse weather conditions are encountered.

The rotary drive coupling 30 is more clearly illustrated in FIGS. 3 to 7 and broadly comprises a ball and socket assembly 32 mounted on the upper kelly bar 19, a clutch plate assembly 33 mounted on the lower kelly bar 31 and a locking arrangement 34 adapted to form a releasable locking connection between the assemblies 32 and 33.

Figure 5:
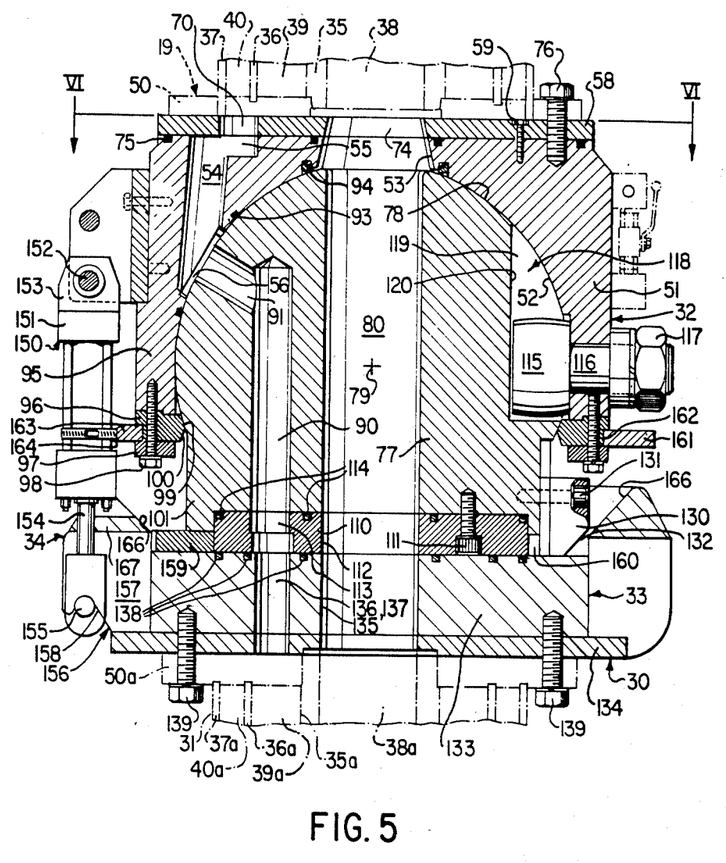
FIG. 5 is a vertical sectional view taken on the line V—V in FIG. 6.

The upper kelly bar 19 comprises inner, intermediate and outer cylindrical walls 35, 36 and 37 respectively defining a central axial passageway 38 surrounded by an intermediate annular passageway 39 and an outer annular passageway 40. The walls 35 to 37 are secured to an end flange 50 of the kelly 19 as by welding. As shown in FIG. 5, the end of the passage 38 is open. The passages 36 and 37 communicate in each case with a series of six or eight angularly spaced holes (not shown) extending through the flange 50.

The assembly 32 comprises a massive socket 51 having a generally cylindrical outer form and a spherically curved internal seating surface 52. A tapered axial passage 53 extends from the seating surface 52 to the upper end of the socket 51. Offset to one side of the passage 53 is an axially directed water passage 54 the upper end of which is radially enlarged as at 55, and the oblique lower end of which has an enlarged section 56 where it meets the surface 52. Diametrically opposed to the passage 54 is a somewhat similarly configured air passage 57 which likewise extends from the top end of the socket 51 to the spherically curved surface 52.

Interposed between the top of the socket 51 and the flange 50 of the kelly 19 is an adapter plate 58 secured to the socket 51 by a series of capscrews 59.

Figure 6:
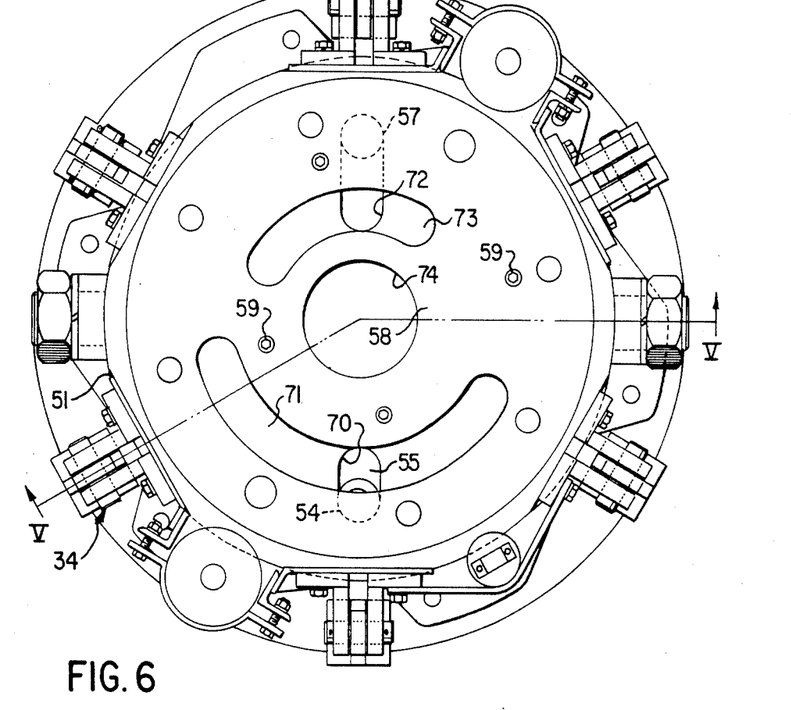
FIG. 6 is a sectional view taken on the line VI—VI in FIG. 5.

As best seen in FIGS. 5 and 6, the adapter plate 58 has a through bore 70 in register with the enlargement 55 of the water passage 54, the upper side of the bore 70 communicating with an enlarged part-annular slot 71 which is of an angular extent sufficient to communicate with a plurality of the holes through the flange 50 leading to the passage 40 in the kelly bar 19. Similarly a through bore 72 communicates with the air passage 71 and opens on the upper side of the retainer plate 58 into an enlarged part-annular slot 73 which in turn communicates with a plurality of the passages leading through the flange 50 from the intermediate passage 39. A tapered central bore 74 in the plate 58 registers with the axial passage 53 in the socket 51 and also communicates with the central passage 38 of the kelly bar 19. Suitable sealing means such as O-rings 75 are interposed between the plate 58 and the top of the socket 51 to prevent leakage of fluid from the passages therein. A series of bolts 76 extend through aligned bores in the kelly bar flange 50, the adapter plate 58, and the upper end of the socket 51 to clamp these members securely in assembled condition.

The arrangement of the various openings provides a first passage system for conveying water from the outer passage 40 of the kelly bar to the spherical surface 52, a second passage system for conveying air from the intermediate passage 39 of the kelly bar to the spherical surface 52, and a third passage system for conveying a return flow from the surface 52 to the central passage 38 of the kelly bar.

The ball and socket assembly 32 also includes a spherically curved ball element 77 received within the socket 51 and having a spherically curved surface 78 in sliding engagement with the spherically curved surface 52 of the socket, both surfaces having a common center of curvature indicated at 79 in FIG. 5. An axial bore 80 extends longitudinally through the ball element 77 and communicates with the passage 53 in the socket. Offset to one side of the bore 80 is an axially directed water passage 90 having an angular extension 91 leading to the spherical surface 78 and communicating with the water passage 54 in the socket. On the opposite side of the bore 80 is a similarly arranged air passage 92 which communicates with the air passage 57 in the socket 51. The interface between the spherical surfaces 52 and 78 is sealed around the communicating passage systems 54, 90 and 57, 92, by suitable sealing means such as O-ring seals 93. The return flow passage system formed by the bore 80 and passage 53 is designed to carry a mixture of air, water and highly abrasive cuttings from the bore hole, and accordingly a more elaborate seal structure 94 is provided at the spherical interface as shown more clearly in FIG. 8.

Figure 8:
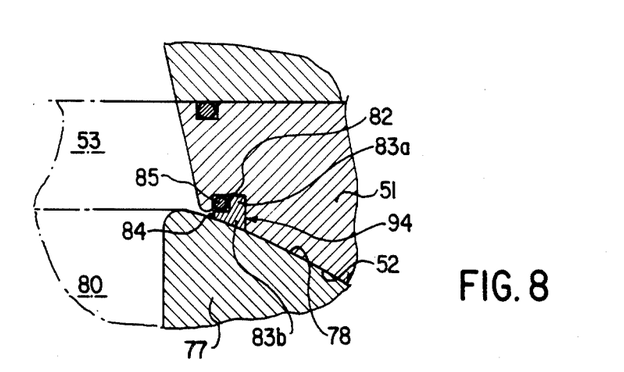
FIG. 8 is an enlarged fragmentary view of a portion of FIG. 5.

The seal structure 94 is received in rectangular annular recess 82 in the socket surface 52 surrounding the passage 53, and comprises an L-section ring 83 of strong plastics material having an upright limb 83a and a lateral limb 83b lying against the socket surface 78 and tapering to a thin lip 84. The seal 94 is an energized seal the limb 83a and lip 84 being urged into engagement with the surface 78 by a loading means formed by a compressed resilient ring 85. The seal therefore acts as a dynamic wiper seal the lip 84 wiping the spherical surface 78 to prevent abrasive solid particles from entering between the bearing surfaces 78 and 52.

It will be seen from FIG. 5 that the area of the lower end of the passage 53 is considerably larger than the area of the bore 80. Likewise, the area of the enlarged lower end 56 of the water passage 54 is considerably larger than that of the extension 91 of the water passage 90, the same being true for the interface between the communicating air passages 57 and 92. Thus the passage sections of the individual passage systems remain in communication even where there is angular misalignment between the axes of the socket 51 and the ball 77. The amount of angular misalignment that can be accommodated is governed by the relative dimensions of the various parts. In the embodiment illustrated the amount is 3°, but this could easily be increased where necessary.

In order to permit entry of the ball 77 into the socket 51, the lower end 95 of the socket skirt is cylindrical on its inside surface and has a diameter equal to the maximum diameter of the ball. To secure the ball into position within the socket 51 an annular retainer ring 96 is provided which together with a mounting ring 97 is clamped firmly against the lower edge of the skirt 95 by a series of capscrews 98 passing through aligned apertures in these parts. As is shown in FIG. 5, the retainer ring 96 has an angled inwardly directed surface with an upper section 99 projecting radially inwards from the skirt and in sliding engagement with the spherically curved surface 78 of the ball. The lower section 100 of this inner surface converges outwardly in the downwards direction to provide clearance during swiveling movements of the ball. The curved surface of the ball occupies somewhat more than a hemisphere in its total extent, the lower end 101 of the ball being of cylindrical form and of a diameter somewhat less than the diameter of the spherically curved portion.

The bottom surface of the ball 77 is recessed and receives a disc-shaped transfer plate 110 which is secured thereto by a series of capscrews 111 and is formed with a central axial passage 112 registering with the axial bore 80, and offset axially directed passages 113 registering with the water passage 90 and air passage 92 respectively. The interface between the transfer plate 110 and the ball 77 is sealed around the passageways by O-ring seals.

In rotary drive, torque is transmitted between the socket 51 and the ball 77 by means of a pair of crowned roller cams 115 arranged coaxially in opposite sides of the socket and each mounted on a bearing structure 116 and retained in position by a fastener arrangement 117. Each roller cam 115 is received in a pocket 118 in the ball 77, the pocket having a cylindrically curved lower end, parallel opposed side walls 119, and a base surface 120 which is parallel to the axis of the bore 80. As seen in FIG. 5, there is sufficient clearance between each roller cam 115 and its pocket 118 to accommodate the required degree of angular misalignment between the socket 51 and the ball 77. The maximum diameter of the roller cam 115 is substantially identical to the spacing between the side walls 119, so that rotary motion of the socket 51 will be transmitted through the cams 115 to the ball 77, constraining the latter to rotate with the socket 51.

The ball and socket assembly 32 coupled to the upper kelly bar 19 is adapted to be releasably connected to the clutch plate assembly 33 which is connected to the lower kelly bar 31, the latter in turn being connected through the drill string to the cutter. For this purpose, the ball 77 carries three drive teeth 130 secured at equal angular intervals around its lower cylindrical end 101, being affixed thereto by set screws 131. As shown in FIG. 5, each drive tooth is a generally rectangular block which projects axially beyond the lower end of the ball 77 and has a chamfered outer surface 132.

The clutch plate assembly 33 comprises a cylindrical disc-like body 133 welded to an enlarged lower flange plate 134. The clutch plate assembly 33 is formed with an axial through bore 135, and radially offset bores 136 and 137 which, in the registered and coupled position shown in FIG. 5, communicate respectively with the central passage 112 and the offset axial passages 113 in the transfer plate 110. The interface between the top surface of the clutch plate body 133 and the transfer plate 110 is sealed by O-ring seals 138 surrounding the various passages and bores.

The lower kelly bar 31 is formed in the same manner as the upper kelly bar 19, having inner, intermediate and outer cylindrical walls 35a, 36a, 37a defining a central axial passage 38a and surrounding annular passages 39a and 40a, these tubular walls being welded to an apertured end flange 50a and the kelly bar being secured in position by bolts 139 received through aligned bores in the flange 50a and the clutch plate assembly 33.

Locking means are provided for releasably securing the ball and socket assembly 32 to the clutch plate assembly 33. This means comprises six hydraulic piston/cylinder assemblies 150 arranged at equal angular intervals around the periphery of the coupling and extending in a generally axial direction relative thereto. As seen in FIG. 5, each piston/cylinder assembly 150 comprises a cylinder body 151 pivotably mounted on a pin 152 extending in a tangential direction with respect to the axis of the socket 51 and mounted in bearing brackets 153 attached to the periphery of the socket 51. Each piston/cylinder assembly 151 has an extensible and retractable piston rod 154 the distal end of which supports a transversely arranged locking pin 155 which projects to opposite sides of the piston rod.

Complementary locking formations 156 are provided on the clutch plate assembly 33, and each comprises a pair of generally radially arranged spaced plates 157 welded to the clutch plate assembly and presenting a downwardly directed jaw 158 adapted to seat the opposite ends of each locking pin 155.

The upper side of the clutch plate assembly 133 carries a flat annular ring 159 which in the engaged position shown in FIG. 5 closely surrounds the transfer plate 110. The ring 159 is formed with segmental gaps 160 angularly spaced around the axis of the assembly 33 and of a width corresponding to the peripheral extent of the teeth 130 (see FIG. 4). In the engaged position shown in FIG. 5, rotary drive is transmitted from the ball and socket assembly 32 to the clutch plate assembly 33 through interaction of the drive teeth 130 with the gaps 160 in the ring 159.

It will be evident that the drive coupling will be retained in the engaged position shown in FIG. 5 so long as the hydraulic loading in the piston/cylinder assemblies 150 is in a direction such as to retract the piston rods and thus urge the pins 155 into snug engagement with the jaws 158 in the locking formations 156.

Figure 7:
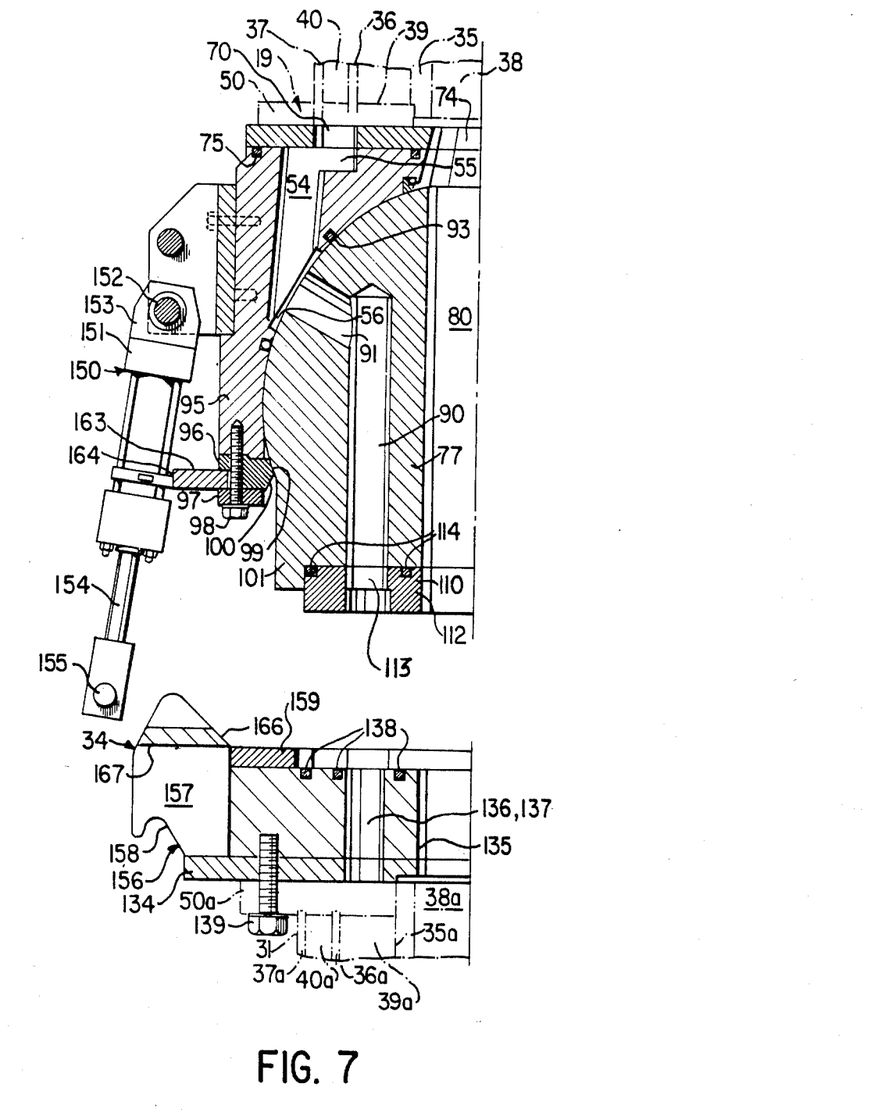
FIG. 7 is a sectional view corresponding to the left half of FIG. 5 showing the coupling elements separated.

To effect disengagement of the ball and socket assembly 32 from the clutch plate assembly 33, it is necessary to disengage the locking pins 155 from the locking formations 156, and then to move these elements out of alignment so that the assemblies 32 and 33 can be moved apart in the axial direction. To effect this displacement, a cam ring 161 is provided in association with the socket 51. The cam ring 161 comprises an annular plate received in an annular recess 162 formed between the retainer ring 96 and the mounting ring 97. The cam ring 161 is rotatable in this recess and is formed with a series of angled ramps 163, there being one ramp for each piston cylinder assembly 150. The ramps 163 are adapted to cooperate with followers 164 suitably positioned on the body of each cylinder 151. The cam ring 161 is rotatable by suitable means (e.g. manually) to bring the respective ramps 163 into engagement with the followers 164. The ramps are so angled that this engagement, upon further rotation of the cam ring 161, tends to urge the piston cylinder assemblies 150 outwardly (i.e. clockwise as seen in FIG. 5). Thus, to separate the coupling from the engaged condition shown in FIG. 5, it is necessary first to extend the piston rods 151 to free the pins 155 from the jaws 158. Thereupon, rotation of the cam plate 161 will cause the piston/cylinder assemblies to be swung outwardly so that the pins 155 are positioned radially outside of the locking formations 156. Thereupon, the ball and socket assembly 32 can be separated in the axial direction from the clutch plate assembly 33, as shown in FIG. 7, without interference by the locking means. Such outwardly swinging movement of the piston/cylinder assemblies 150 is opposed by a resilient means in the form of a series of coiled springs 165 arranged in the form of a peripheral band connecting each of the piston/cylinder assemblies 150 with the next adjacent one and acting in the manner of a garter to draw these assemblies 150 inwardly.

Means are provided to guide the two coupling parts, namely the ball and socket assembly 32 and the clutch plate assembly 33, into a registering position as they are advanced axially towards one another to establish the coupling. Such guide means comprise a frusto-conical peripheral ramp surface 166 on the upper side of the clutch plate and angled downwardly and inwardly thereon. At the location of each of the locking formations 156, this ramp surface defines recesses 167 to accommodate the piston rod 154 and the lower end of the cylinder 153, as seen in the right hand side of FIG. 5.

Thus, when the coupling is to be established the ball and socket assembly 32 is lowered axially towards the clutch plate assembly 33, and if these elements are axially misaligned the chamfered lower surfaces of the drive teeth 130 will engage upon the inclined ramp 166, and since both of these surfaces are conically formed, will effect transverse shifting of the assemblies 32, 33 until they are in a position of axial alignment. Thereupon, further axial lowering of the ball and socket assembly 32 can proceed until the drive teeth 130 encounter the upper side of the ring 159 on the clutch plate assembly 33. The ball and socket assembly 32 can then be rotated slowly under axial load so that when the drive teeth 130 come into register with the gaps 160 in the ring 159 the ball and socket assembly 32 can be further lowered axially into the fully engaged position as shown in FIG. 5. During this movement the piston/cylinder assemblies 150 are, of course, held in outwardly spread arrangement by the ramps 163 of the cam ring 161.

Once the fully engaged position is reached, the cam ring 161 is rotated to allow the piston/cylinder assemblies 150 to swing inwardly under the force of the springs 165 to bring each of the pins 155 into axial alignment with the jaw 158 of the respective locking formation 156. Thereupon, retraction of the piston rods 154 will draw the pins 155 into firm engagement with the jaws 158 thus securing the coupling in the fully engaged condition. The force of this engagement will be dependent upon the hydraulic retracting force acting upon the piston/cylinder units 150, and will of course be sufficiently high to maintain the integrity of the engagement without imposing an excessive compressive loading on the coupling.

It will be seen that the rotary drive coupling above described and illustrated in the drawings provides means for supplying discrete flows of water and air through the drill string to the cutter via the passage systems 54, 90 and 57, 92 respectively, and provides for a return flow of drilling cuttings entrained in a mixture of water and air through the passage system provided by the axial passages 80, 83. Torque is transmitted from the socket 51 to the ball 77 by cooperation of the cams 115 with the pockets 118, and from the ball 77 to the clutch plate assembly 33 through cooperation of the drive teeth 130 with the gaps 160 in the ring 159. The arrangement of these parts is such that very high torque loadings may be transmitted. The drive teeth 130 are readily removable and replaceable, and accordingly are preferably made of a comparatively soft material so as to absorb any wear which may occur in the system.

The spherically curved interface between the ball 77 and socket 51 provides a very large bearing surface so that the coupling can transmit extremely large axial loads without binding and without undue wear. Suitable lubricating substances are applied between the mating spherical surfaces and between the pockets 118 and the cam rollers 115 to prevent excessive wear. It will be appreciated that by virtue of the nature of the locking means provided by the hydraulic piston/cylinder assemblies 150 and the locking formations 156, the drive coupling can be established and disconnected with rapidity.

Figure 3:
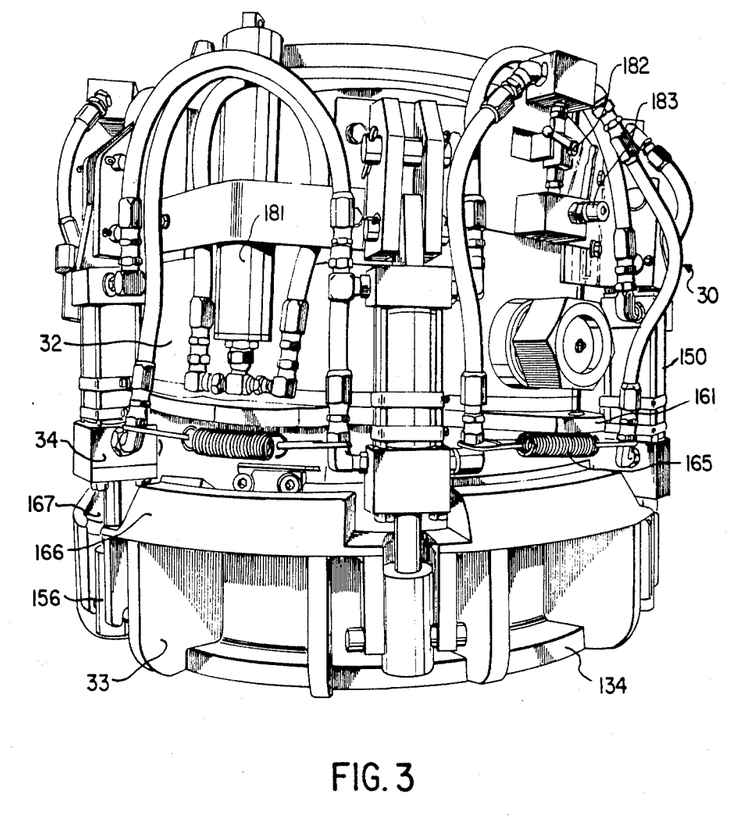
FIG. 3 is a side view of the rotary drive coupling.
Figure 4:
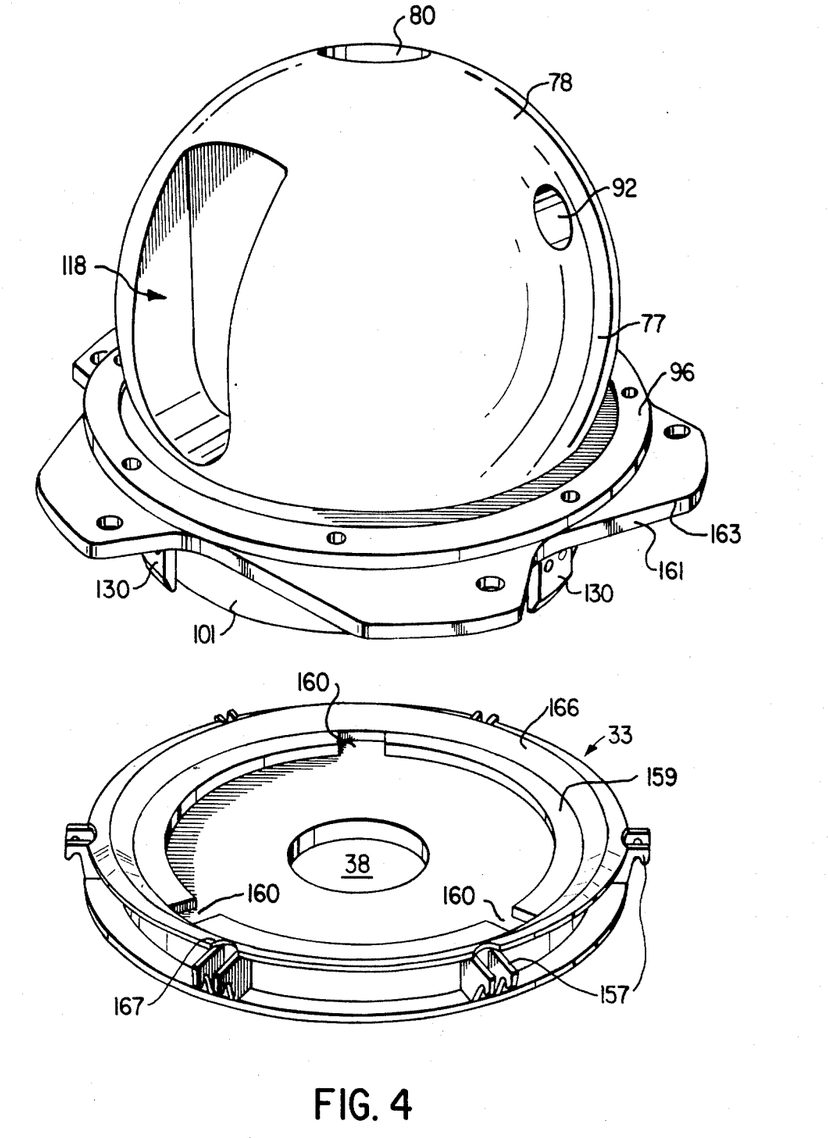
FIG. 4 is a perspective view of a ball element and a clutch plate as used in the rotary drive coupling.

By virtue of the hydraulic locking system chosen, and the configuration of the ball and socket connection, the drive coupling can readily accommodate minor angular misalignment between the axes of the upper kelly bar 19 and the lower kelly bar 31. As explained above, the relative sizes of the passages in the ball 77 and in the socket 51 at the spherical interface surfaces are so designed that these passages remain in communication throughout the angular range of misalignment. FIG. 3 illustrates the coupling in the condition assumed when the axis are angularly misaligned. It will be evident that, to enable the coupling to rotate in this condition, a cyclical extension and retraction movement of each piston rod 154 must occur as it moves around the periphery of the coupling. The hydraulic system of the locking means is designed to provide this movement while still maintaining the integrity of the coupling.

Figure 9:
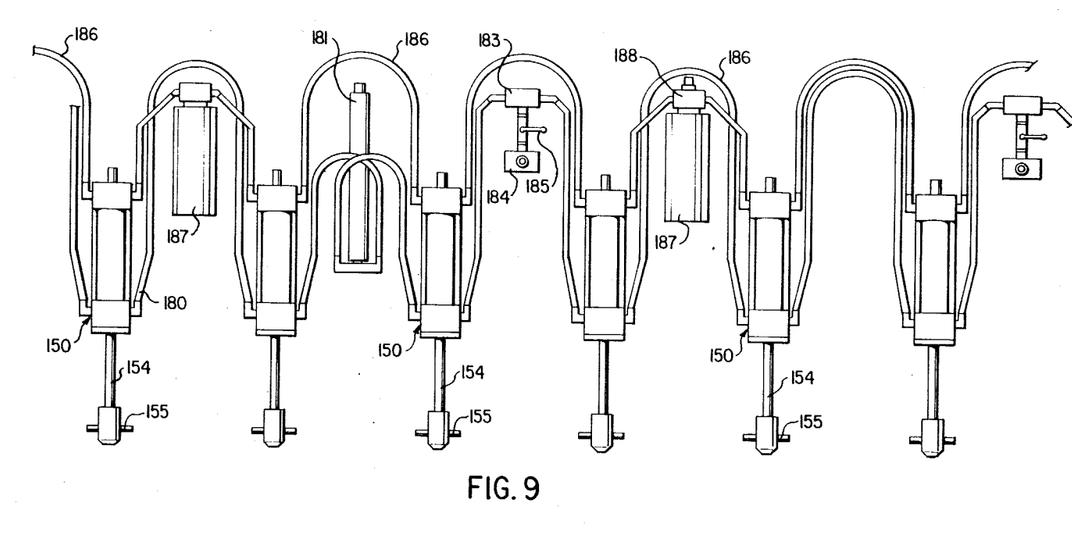
FIG. 9 is a somewhat schematic diagram of the hydraulic circuit.

Referring to the schematic hydraulic view of FIG. 9, the six piston/cylinder assemblies 150 provided in the locking arrangement are illustrated. The lower end of each piston is supplied with high pressure hydraulic fluid, and these lower ends are interconnected in series through a system of hoses 180. Also connected in this high pressure system is a high pressure hydraulic accummulator 181 and a valve structure 182 which incorporates a filler valve 183 a bleed valve 184 and a control element 185. The filler valve is adapted to be coupled to a pressure supply means (not shown) which may conveniently comprise a manually operated hydraulic pump, by means of which pressure is supplied to the high pressure hydraulic circuit. The upper ends of the piston/cylinder assemblies 150 are interconnected through a system of low pressure hoses 186 in a hydraulic circuit which includes low pressure accummulators 187 provided with a control means 188 incorporating filler and bleed valves.

From the configuration of the above described hydraulic circuits it will be seen that rotation of the coupling at the operating speeds normally encountered (e.g. about 30 rpm) can be accommodated by transfer of hydraulic fluid successively between the high pressure ends of the piston cylinder assemblies 150 and successively between the low pressure ends thereof, the piston rods 150 performing in each revolution a minor cyclical extension and retraction movement. However the high pressure circuit is at a very much greater pressure than that in the low pressure circuit and therefore at all times there is a strong resultant upwards thrust on each piston rod 154 so that through interaction of the pins 155 with the jaws 158 the coupling is retained in secure engagement.

When the drive coupling is established by bringing together the ball and socket assembly 32 and the clutch plate assembly 33 in the axial direction, the piston assemblies 150 are held in spread-apart arrangement by the cam ring 161, and the piston rods 154 are in extended condition. Once the drive teeth 130 are in full engagement with the sockets 160, the cam plate 161 is rotated to allow the pins 155 to swing into registration with the jaws 158, and the piston rods 154 are retracted by supplying high pressure hydraulic fluid to the high pressure hydraulic system 180. This can be done by connecting the manually actuated hydraulic pump to the filler valve 183, and operating it until all of the piston rods 154 have been retracted and a predetermined pressure level exists in the system 180. The hand pump can then be disconnected from the filler valve 183 while the high pressure is retained in the system 180, the high pressure accummulator 181 ensuring that hydraulic pressure is maintained despite any minor leakages which may be present in the system. The coupling can then be driven in rotation to power the drill cutter.

When it is desired to disconnect the coupling, rotation is terminated and the high pressure valve 183 is connected to a hose (not shown) leading to a fluid reservoir. Upon opening the valve 185 high pressure fluid is released from the circuit 180 thus reducing the pressure therein. When the pressure in the high pressure system 180 becomes less than that in the low pressure system 186 the piston rods are automatically extended to disengage the pins 155 from the jaws 158, whereupon the cam plate 161 can be rotated to swing the piston/cylinder assemblies outwardly. The ball and socket assembly 32 can then be lifted axially from the clutch plate assembly 33. If the pressure of the hydraulic fluid in the low pressure system 186 is insufficient to effect extension of all of the piston rods 154 (e.g. due to leakage or friction in the seals) the hand pump can be connected to the low pressure system 186 and actuated to increase the pressure therein to a level sufficient to effect full extension of all piston rods.

The rotary drive coupling described above and illustrated in the drawings is capable of transmitting very high torques and axial loads. The example illustrated, having a ball 77 of a diameter 20 inches is designed to transmit a torque of 90,000 foot pounds at 30 rpm, and to be capable of applying a compressive force of 100,000 pounds and a tensile force of 70,000 pounds while accommodating an angular misalignment between the axis of the upper kelly bar 19 and the lower kelly bar 31 of up to 3°. Air and water are channeled downwardly at high pressure in separate flows through the rotary coupling to the drill bit and conduct the rock cuttings upwardly through a five inch diameter central passageway. The coupling can be connected without the use of any power tool or external source of hydraulic fluid other than the hand operated pump in approximately five minutes and can be disconnected as described above in less than one minute.

The ability of the coupling to accommodate angular misalignments is of great importance when applied in drilling operations conducted from a floating platform, since the angular misalignment can absorb the minor variations caused by wave action and tides etc. which otherwise would apply severe and destructive loadings on the kelly bars and fasteners of a rigidly connected rotary drive coupling.

The ability to establish and disconnect the coupling rapidly is of decisive importance when drilling from a floating platform such as a scow since it provides the ability to rapidly discontinue the drilling operation and remove the scow when adverse weather conditions occur. In conventional rigidly connected couplings the connecting and disconnecting operations are very time consuming, and in extreme weather conditions may be virtually impossible.

I claim:

1. A coupling for transmitting a rotary drive between a driving member and a driven member that are engagable in a mutually registered position, said coupling comprising:
(a) two bearing elements each associated with a respective one of said members and co-operating to transmit axial thrust between said members, said bearing elements having interengaging bearing surfaces that are spherically curved to permit limited angular misalignment between the axes of said members;
(b) torque-transmitting means on said members co-operating to transmit the rotary drive;
(c) locking means engagable to form locking connections between said members and between one said member and its associated bearing element; and
(d) selectively actuable control means carried by said coupling for rapidly controlling engagement and disengagement of said locking means;
wherein said locking means when engaged is adapted to accommodate only limited misalignment while maintaining firm engagement of said members against high separation forces, and is adapted to disengage rapidly in response to operation of said control means, to permit separation of said one member from its associated bearing element and hence separation of said members while said bearing elements remain engaged.

2. A coupling according to claim 1 including at least two passage systems for transmitting separate flows of fluid through the coupling, each said system extending across the joint face between said bearing surfaces; and seal means sealing said joint face around the passage sections of each said system.

3. A coupling according to claim 2 wherein there are three said passage systems comprising first and second lateral passage systems formed by bores which meet at said spherically curved bearing surfaces and are adapted to transmit separate flows of fluids at high pressure from the driving member to the driven member; and a third passage system comprising axial bores in said members and adapted to transmit a mixture of abrasive solids and fluids from said driven member to said driving member, the bores of said passage systems remaining in communication throughout the range of angular misalignment.

4. A coupling according to claim 3 wherein the central axial passage between these spherical surfaces is sealed by an abrasion resistant energized dynamic wiper seal.

5. A coupling according to claim 1 wherein said locking means is fluid-power actuated.

6. A coupling according to claim 1 wnerein said locking means comprises a plurality of fluid powered actuators symmetrically arranged about said coupling and extending generally axially thereof, each said fluid actuator being attached at one end on one said member and having its other end formed for releasable locking engagement with the other said member.

7. A coupling according to claim 6 wherein each said fluid-powered actuator comprises a piston/cylinder unit having an extensible piston rod that carries a locking element.

8. A coupling according to claim 7 wherein in the registered position of said members, each locking element is movable respectively into or out of engagement with a complementary locking formation on said other member upon retraction or extension of said piston rod, and when out of such engagement is displaceable out of alignment with said locking formation to permit axial separation of said driving member and said driven member.

9. A coupling according to claim 8 including resilient means urging said locking element into alignment with said locking formation.

10. A coupling according to claim 8 wherein each said cylinder is pivotally mounted on said one member on an axis transverse to the axis of rotation and is displaceable out of alignment by a movable cam.

11. A coupling according to claim 8 wherein each said cylinder is pivotally mounted on said one member on an axis transverse to the axis of rotation, said one member supporting a rotatable cam plate having a plurality of individual ramp surfaces each engagable with a respective cylinder and operable upon rotation of said cam plate to swing said cylinders in unison radially outwardly to move the locking elements thereof against the force of a resilient means out of alignment with the locking formations.

12. A coupling according to claim 11 wherein there are six piston/cylinder units arranged at equal angular intervals around the coupling and said resilient means comprises six circumferentially arranged springs each connected at its end to an adjacent pair of piston/cylinder units.

13. A coupling according to claim 7 wherein said piston/cylinder units are hydraulically coupled to act in unison, the corresponding ends of the piston/cylinder units being at all times in hydraulic communication so that said limited misalignment is accommodated by transfer of hydraulic fluid from unit to unit as the coupling rotates.

14. A coupling according to claim 7 wherein said piston/cylinder units are hydraulically coupled to act in unison, each unit having a piston end chamber and an annulus end chamber which are separated by the piston, the piston end chambers of all the units being in hydraulic communication and the annulus end chambers of all units being in hydraulic communication, one set of end chambers being connected to hydraulic accumulator means that is effective to extend the cylinder rods to effect disengagement of the locking means upon release of hydraulic pressure from the other set of end chambers.

15. A coupling according to claim 1 wherein said bearing surfaces are provided within a ball and socket connection carried on said driving member and comprising a socket element and a mating ball element having spherically formed interengaging surfaces and being capable of a limited relative swiveling action, said ball member being adapted for connection to said driven member.

16. A coupling according to claim 1 wherein said locking means includes co-operating guide means on said one said member and its associated bearing element operative to guide them into said registered position as they are moved into engagement with each other.

17. A coupling for transmitting a rotary drive between a driving member and a driven member that are engageable in a mutually registered position, said coupling comprising:
(a) a bearing system, said bearing system including (i) two bearing elements each associated with a respective one of said members and cooperating to transmit axial thrust between said members, said bearing elements having interengaging bearing surfaces that are spherically curved to permit limited angular misalignment between the axes of said members; (ii) a first attaching means for attaching one of said bearing elements securely to one of said members; and (iii) a second attaching means for attaching the other of said bearing elements rotatably to the first-mentioned said bearing element;
(b) a torque transmitting means for transmitting the rotary drive between said bearing system and the other of said members, said torque transmitting means including a first transfer surface on the other of said bearing elements and a second transfer surface on the other of said members, said first and second transfer surface being mutually engageable;
(c) a releasable locking means for releasably locking said transfer surfaces in mutual axial engagement with one another, said locking means being separate from said transfer surfaces and including an actuated latch attached to one of said members whereby said members are releasably locked to one another in association with an adjacent said bearing element; and
(d) a control means which is selectively actuatable for controlling engagement of said locking means;
wherein said locking means when engaged is adapted to accommodate any limited misalignment while maintaining firm engagement of said members against high separation forces, and is adapted to disengage rapidly in response to operation of said control means to permit rapid separation of the other said member from its associated bearing element and hence separation of said members while both of said bearing elements remain engaged to the first-mentioned said member.

18. A coupling according to claim 17 wherein said transfer surfaces are substantially planar and wherein one said transfer surface includes teeth and the other said transfer surface includes gaps in which said teeth are located.

* * * * *